United States Patent [19]
Dyer et al.

[11] Patent Number: 5,161,155
[45] Date of Patent: Nov. 3, 1992

[54] AUTOMATIC TELECOMMUNICATIONS SYSTEMS

[75] Inventors: Arthur J. Dyer; Stephen C. Redman, both of London, England

[73] Assignee: STC PLC, London, England

[21] Appl. No.: 410,338

[22] Filed: Sep. 21, 1989

[30] Foreign Application Priority Data

Sep. 30, 1988 [GB] United Kingdom ............... 8823079

[51] Int. Cl.[5] ..................... H04L 12/56; H04J 3/12; H04G 11/04
[52] U.S. Cl. ................................. 370/110.1; 370/60; 370/60.1
[58] Field of Search ............... 370/60, 60.1, 94.1, 370/94.2, 94.3, 110.1, 56, 112

[56] References Cited

U.S. PATENT DOCUMENTS 4,821,265 4/1989 Albal et al. .................. 370/94.1
4,835,769 5/1989 Donaghue, Jr. et al. ......... 370/110.1

FOREIGN PATENT DOCUMENTS 0196772 10/1986 European Pat. Off. .
0325794 8/1989 European Pat. Off. .
2185657 7/1987 United Kingdom .

OTHER PUBLICATIONS

CCITT-Rec. Q. 920 and Q. 921.
International Conference on Communications '88, Session 47, paper 3, vol. 3, Jun. 12, 1988, Philadelphia, US pp. 1-6, E. Amada et al., "Integrated PABX/LAN system architecture".

Primary Examiner—Douglas W. Olms
Assistant Examiner—Wellington Chin
Attorney, Agent, or Firm—Lee, Mann, Smith, McWilliams, Sweeney & Ohlson

[57] ABSTRACT

An automatic telephone system enabling subscribers access to more than one network (3,4). The subscriber's line (2) accesses the networks (3,4) via a highway providing at least two traffic channels (B) and one signalling channel (D). The signalling channel (D) conveys call setting and other signalling for calls set up via any traffic channel (B). Access of a particular traffic signal channel to a particular network is provided by an intelligent multiplexer/concentrater (1) in response to a network identifier carried by the signalling channel, for example an appropriate value of a SAPI (Service Access Point Identifier) in the case of an ISDN I-Series signalling system.

6 Claims, 1 Drawing Sheet

AUTOMATIC TELECOMMUNICATIONS SYSTEMS

SUBJECT OF THE INVENTION

This invention relates to automatic telecommunications systems enabling subscribers access to more than one network.

BACKGROUND TO THE INVENTION

In a deregulated telecommunications environment, a problem arises in providing means for telephone service users to access networks in addition to the original PTT telephone network, such as is provided by, for example, British Telecom in the U.K. Such an additional network might be the network of another carrier providing the same range of services as the original PTT network, or a network providing an enhanced or specialized range of services, such as the so-called "Value Added Network". The problem arises because the PTT owns and operates the local network comprising the local exchange and the wire pairs over which telecommunications access to the customer's premises is provided. Typically the problem is solved by allocating to the customer a number within the local numbering plan of the original network for each additional network, to give access to that network through the original network's local exchange. This number is thus used as a prefix to the numbers in the additional network's numbering scheme. The prefix may be generated automatically as a result of a single operation, for example by depressing a key on the customer's telephone equipment. There is, however, a time penalty associated with the signalling of the prefix for outgoing calls, while for incoming calls from the additional network there is the need for this network to signal into the original network's local exchange to complete the switching of the call to the subscriber. There may also be the need for number translation when crossing carrier network boundaries.

SUMMARY OF THE INVENTION

According to one aspect of the present invention there is provided an automatic telecommunications system in which the subscribers' lines served include first lines with access to more than one network, in which each said first lines access the networks via means including a respective highway which provides at least two channels usable for conveying traffic signals and one signalling channel which signalling channel conveys call setting and other signalling for calls set up via any said traffic signal channel, and in which access of a said traffic signal channel to a required network is provided in response to a network identifier associated with that network and carried by the signalling channel.

According to a further aspect of the present invention there is provided an automatic telecommunications system in which the subscribers' lines served include lines with access to at least two different networks, in which the said lines are connectable to switching nodes associated with the two networks via a time-division-multiplex (TDM) highway which provides at least two TDM channels usable for conveying traffic signals and one digital signalling channel, in which one of said TDM channels provides access to one of said networks while another of said TDM channels provides access to the other of said networks, and in which the signalling channel conveys call setting and other signalling for calls set up via both of said TDM channels.

According to another aspect of the present invention there is provided an automatic telephone system enabling subscribers' access to at least two networks and employing an ISDN basic access multiplexer/concentrater and a local loop transmission system involving at least two traffic channels and a signalling channel which carries signalling for all said traffic channels, each traffic channel either being dedicated to a respective network or being associatable with any said network, and in which the multiplexer/concentrater provides access of a said traffic channel to a required network in response to a network identifier carried by the signalling channel.

The term "multiplexer" implies an arrangement whereby there is provided for each subscriber's traffic channel a correspondingly dedicated traffic channel at the point of access to a network. The term "concentrater" implies an arrangement whereby there are fewer traffic channels at the point of access to a network than there are subscribers' traffic channels, and whereby such network access traffic channels are associated with subscriber traffic channels on demand, on a per-call basis. It should be noted that this invention encompasses both of these arrangements and that, furthermore, a single implementation could include one or more primary access points operating in the multiplexer mode and one or more primary access points operating in the concentrater mode; all of such primary access points serving the same group of subscriber traffic channels. The term "multiplexer/concentrater" is used in this application to encompass all-multiplexer, all-concentrater and mixed multiplexer/concentrater modes of operation.

BRIEF DESCRIPTION OF THE DRAWINGS

Embodiments of the present invention will now be described with reference to the accompanying drawings, in which.

DESCRIPTION OF THE PREFERRED EMBODIMENTS

The difficulties associated with providing telephone service access over an existing copper pair to users of more than one network can be avoided by adapting a transmission system developed for ISDN (Integrated Services Digital Network) customer access (basic access at the U-interface) which provides a user with two telephone channels over the existing single copper pair serving his premises. Each channel may be dedicated to a single network, although this is not the only possibility. The other end of the copper pair, which is typically situated on a local exchange premises or at a remote site, is terminated at an intelligent multiplexer/concentrater, which routes each channel to the appropriate network. The routing may be at a Basic (e.g. return-to-analogue) level or, more efficiently, at a Primary (2048 kbit/s) level. The transmission media or system does not, however, need to be of the ISDN type described above, it can however, simply be a local loop, other examples could be nB+D over copper, optical access at the Primary or other rate, or the signalling could be carried by a channel over an analogue PSTN connection, for example within the MF call set-up tones. Our GB Applications Serial numbers 2 111 354, 2 161 676 and 2 182 816 (D.A. Fisher 3, 4 and 5) (U.S. Pat. Nos. 4,539,675, 4,766,589 and 4,878,232) describe various aspects of a system that uses advanced digital transmission techniques to achieve full bidirectional transmission of two traffic channels (B channels) each at 64 kbit/s and one signalling channel (D channel) at 16 kbit/s over a local loop that conforms with the planning limits of local 2-wire networks such as those operated by British Telecomm (BT). The B channels are multiplexed, such as time division multiplexed, on a highway between the subscribers local loop lines and switching nodes, signalling from the subscriber is encoded on the D channel.

Figure 1:
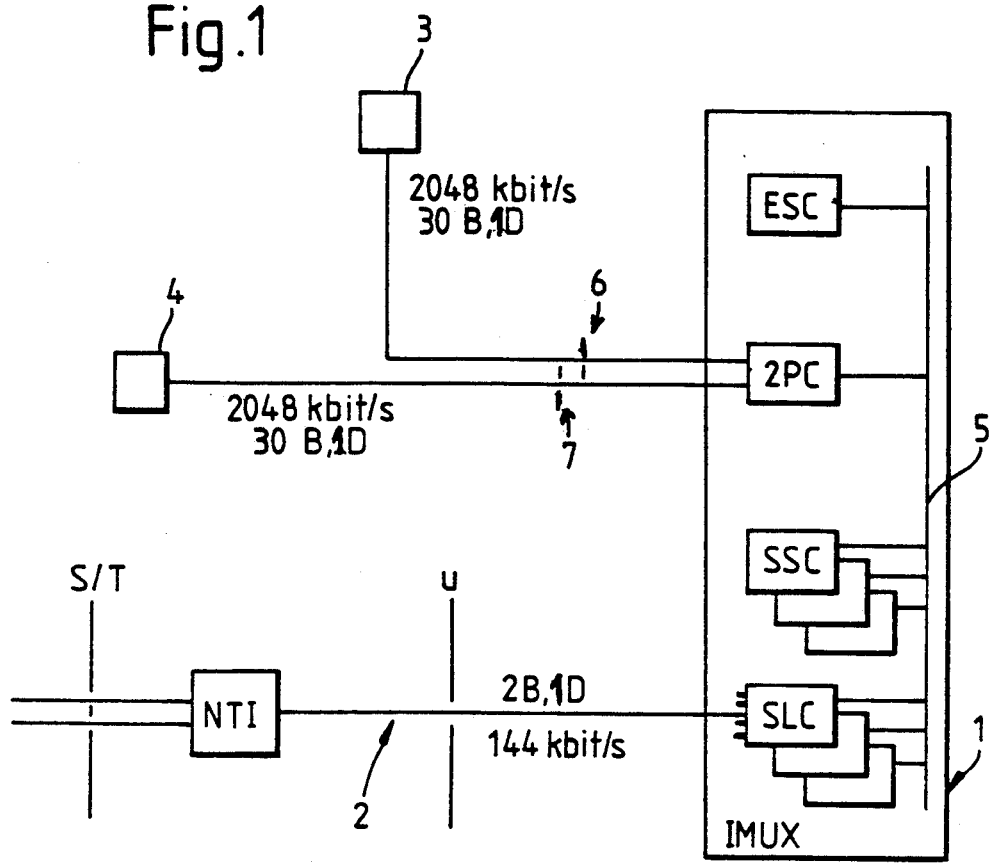
FIG. 1 illustrates a system allowing subscriber access to two networks.

An ISDN application will now be described with reference to FIG. 1. In the ISDN application the aforementioned highway is used as the transmission medium at the ISDN "U" reference point which lies between the "V" reference point (not shown) within an intelligent multiplexer (IMUX) 1 and the S/T reference point which is on the customer's side of the network termination (NT1). Reference numeral 2 indicates the local 2-wire network. The pair of B Channels are associated together with the D-channel as a basic access point to an ISDN network 3.

The two traffic B channels are used to provide access to two telephone networks, 3 and that indicated by reference numeral 4, the signalling for both B channels being carried by the D channel. In the implementation illustrated the multiplexer 1 includes a tributary unit or subscriber's line card (SLC) serving the local loop which connects each B-channel with a back plane data highway, at a bus structure 5, associated with traffic for the network being accessed by the B channel in question. Each SLC in this implementation serves up to five local loops. As will be appreciated, as illustrated the connection between a subscriber and the ISDN IMUX is at Basic Rate ISDN 144 kbit/s with two B and one D channel in each direction. The multiple B channels are combined by TDM (Time-Division-Multiplexing) at the IMUX to form primary rate ISDN which is at 2048 kbit/s and organised as thirty B channels plus one D signalling channel, plus one channel used for frame synchronisation.

In order to indicate which network a call is required to be connected to, the signalling on the D-channel is characterised by the fact that each signal frame carries an appropriate network identifier to indicate which network is associated with the call to which the signal is related. Thus, in general terms, if each B channel is dedicated to a respective single network and a call is to be made, the appropriate B channel for that network will be chosen in response to the signalling from the subscriber and the signalling will be encoded on the D channel so that each signal frame carries the corresponding network identifier, this being used by the IMUX to select which network is to be accessed.

In one possible implementation the D-channel signalling can be based on the ISDN I-Series signalling system, which includes at Level 2 a component known as the Service Access Point Identifier (SAPI) which can be used to identify the network. This aspect will be described in greater detail subsequently. In this same implementation, and as illustrated schematically in FIG. 1, the signalling information on the D-channel is processed on a Subscriber Signalling Card (SSC) associated with the SLC and is transferred between the SLC and the SSC by another backplane data highway of bus structure 5. The processing on the SSC consists at least of terminating the LAP (Link Access Procedure) on the D-channel and examining the SAPI to verify which network (3 or 4) each signalling packet received on the D-channel is destined for, and queuing it for output on the Common Channel Signalling (CCS) timeslot (usually Timeslot 16) on the primary interface 6 or 7 serving that network, via 2-port card 2PC. Also illustrated as part of the IMUX 1 is a Exchange signalling card ESC.

In cases where the signalling protocol used on the network 3 or 4 is different from that used on the D-channel on the subscriber loop, a protocol translation process will need to be performed on the ESC.

If the multiplexer 1 has two primary interface points, 6 and 7 as illustrated, calls may be routed in a non-blocking way to and from local exchanges, or equivalent network entry point, of two different networks, by allocating one B channel at the U reference point to each network as described above. Alternatively, if blocking were allowed, the calls of either network could be routed via either B channel at the U reference point, according to availability at the time of making the call, the signalling from the subscriber serving to encode the appropriate network identifier on each signal frame of the D channel.

This technique can be extended to other types of services, e.g. ISDN/PSTN; ISDN/digital leased line; ISDN/packet; and access, with blocking, to more than two different networks. With the use of higher tranmsmission rates, for example over copper pairs, or via an optical medium, more than two B-channels could be provided at the U reference point, giving the possibility of more than two simultaneous calls and non-blocking access to more than two networks. As will be appreciated the technique achieves effective pair gain between the subscriber and the local exchange, that is the local loop acts as more than one pair.

The network to which a call is connected by the IMUX depends as far as the subscriber is concerned, on the number input by the subscriber, the signalling on the D-channel carrying the network identifier and causing appropriate connection, The SAPI, which is used to address, for example, either of two networks in the messages passing between the subscriber equipment and the multiplexer, will now be described in further detail. In OSI (Open Systems Interconnection) terms, these messages consist of Layer 3 (Network Layer) messages performing call-related functions, such as sending selection digits, Recall or Call Clearing, and are sent within a Layer 2 (Data Link) envelope. It is in the Layer 2 envelope that the SAPI resides, and it is by the choice of a different SAPI for each network to be accessed that the system operates.

Conventionally, according to CCITT recommendations a SAPI value of 0 (zero) is used for a circuit-switched call and there is no provision for the subscriber to have a choice of network at the local level. However, there are plenty of unallocated SAPI values out of the total of 64 possible values (0–63) allowed, including a range (32–47) reserved for national use. From this range values can be selected in any particular implementation to represent different networks at a given exchange. The appropriate SAPI is disposed in the envelope in each call control message in each direction in the D-channel between the IMUX and the subscriber.

Figure 2:
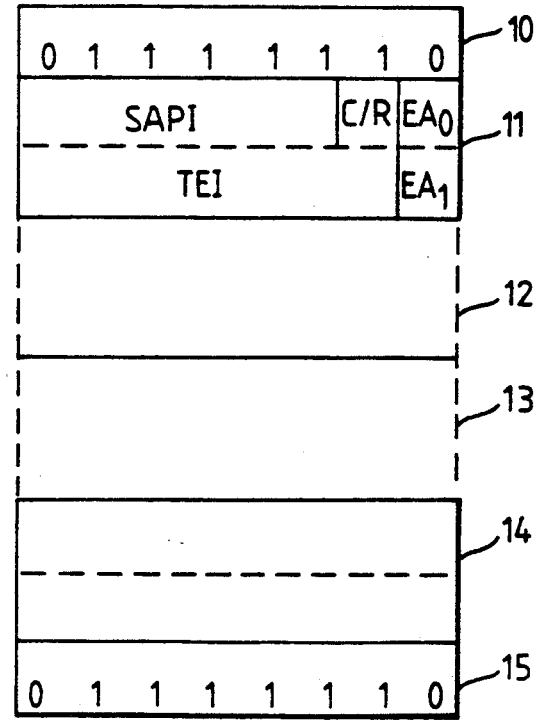
FIG. 2 illustrates the Layer 2 frame format for a D channel.

The layer 2 envelope is, is in this instance, as illustrated in FIG. 2. The frame format includes an opening flag sequence 10 and an address field 11 which identifies the intended receiver of a command frame and the transmitter of the response frame. The address field 11 contains the SAPI as well as, in this instance, an address field extension bits $EA_0$ and $EA_1$, a command/response field bit C/R and a terminal endpoint identifier TEI. The frame format further includes a control field 12; an information field 13 which contains the Network Layer call control message being sent in the envelope; a frame checking sequence 14 and a closing flag sequence 15.

We claim:

1. An automatic telecommunications system enabling subscribers to access more than one remote network, wherein the subscribers' lines served include first lines each having access to said remote networks, in which each said first line accesses the remote networks via means including a respective highway for each said first line and an intelligent multiplexer/concentrater to which all of the highways are connected, wherein each highway provides at least two channels usable for conveying traffic signals and one signalling channel, which signalling channel conveys call settings and other signalling for calls set up via any said traffic signal channel, and wherein access of said traffic signal channel to a required remote network is provided in response to a network identifier associated with that remote network and generated in response to signalling from a subscriber, which network identifier is encoded onto the signalling channel, and wherein the intelligent multiplexer/concentrater serves to route each traffic signal channel to the required remote network in response to the network identifier.

2. An automatic telecommunications system as claimed in claim 1, wherein each highway is a time-division-multiplex (TDM) highway providing TDM channels comprising said traffic signal channels and a digital signalling channel comprising said signalling channel.

3. An automatic telecommunications system as claimed in claim 2 wherein there are two remote networks and two traffic signal channels, each traffic signal channel being dedicated to a respective one of the two remote networks.

4. An automatic telecommunications system as claimed in claim 1 wherein the multiplexer/concentrater is a ISDN multiplexer and the network identifier is a predetermined value of a service access point identifier (SAPI) for each remote network.

5. An automatic telephone system as claimed in claim 4 wherein there are two traffic channels (B channels) and one signalling channel (D channel) and the signalling on the D channel is such that each signal frame carries the appropriate network identifier to indicate which remote network is associated with the call to which the signal is related.

6. An automatic telephone system enabling subscribers access to at least two remote networks and employing an ISDN basic access multiplexer/concentrater and a local loop transmission system including at least two traffic channels and a signalling channel which carriers signalling for all traffic channels, each traffic channel either being dedicated to a respective remote network or being associatable with any said remote network, and in which the multiplexer/concentrater provides access of a said traffic channel to a required remote network in response to a network identifier generated in response to signalling from a subscriber and encoded onto the signalling channel, the network identifier being a predetermined value of a service access point identifier (SAPI) for each remote network.

* * * * *